United States Patent Office 2,752,352
Patented June 26, 1956

2,752,352

DERIVATIVES OF THE ESTERS OF BETA-KETONIC ACIDS AND PROCESS

Jules Henri Theophile Ledrut, St. Gilles-Brussels, Belgium, assignor to Heyden Pharmacal Company, New York, N. Y., a corporation of Delaware No Drawing. Application December 20, 1952, Serial No. 327,167

4 Claims. (Cl. 260—294.3)

My invention relates particularly to a process for the preparation of derivatives of esters of ketonic acids, as, for example, when a $\beta$-ketonic ester is reacted with formaldehyde and a secondary amine, as well as the products formed thereby.

This application is a continuation-in-part application of my copending application Serial No. 83,773, filed March 26, 1949, and now abandoned.

It has been known previously that condensation of esters of $\beta$-ketonic acids with ammonia and an aldehyde conduces to the formation of derivatives of pyridine.

If a secondary amine is used, in the place of ammonia, there are obtained, not the basic products of transposition, but, instead, bis-methylenic compounds. Thus, by condensation of a benzoylacetic ester with formaldehyde and a secondary amine there is obtained a bis-methylene-benzoylacetic ester.

In accordance with my present invention, I have discovered that the above reaction takes place in a different manner if there is introduced an alkyl radical at $\alpha$ in the ester of a $\beta$-ketonic acid. The reaction is retarded by the great acidity of the enol group located at $\beta$ in the ester of the $\beta$-ketonic acid.

According to my invention, there is used, at the start, an ester in such a way as to obtain a derivative having the general formula

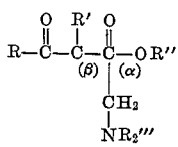

in which R designates an alkyl or an aryl radical, R' and R'' designate an alkyl radical and NR$_2$''' is a N-dialkyl radical or the N-piperidyl radical.

As the preferred ester there is prepared, according to my invention, the ethyl $\alpha$-ethyl-$\alpha$-diethylaminoethyl-acetoacetate by the reaction of ethyl $\alpha$-ethyl-acetoacetate with diethylamine and formaldehyde.

Instead of formaldehyde, there can be used paraformaldehyde together with an ester of a $\beta$-ketonic acid and a secondary amine.

This invention also has relation to a process for the preparation of a second alcohol by the hydrogenation of an alkyl derivative of an ester of a $\beta$-ketonic acid. According to this invention, the hydrogenation can be carried out with the aid of aluminium amalgam, with an alkyl derivative of an ester of a $\beta$-ketonic acid having the general formula

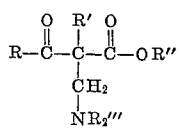

in which R designates an alkyl or an aryl radical and R' and R'' each designate an alkyl radical and NR$_2$''' is a N-dialkyl radical or N-piperidyl radical, in such a way as to obtain a secondary alcohol having the general formula

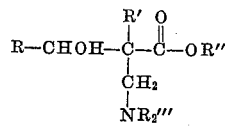

in which R, R' and R'' and NR$_2$''' have the significance indicated above.

Furthermore, the invention herein, likewise, has reference to a process of preparing a benzoyl derivative or a p-nitrobenzoyl derivative of a secondary alcohol, in which this alcohol is reacted with a haloid of benzoyl or of p-nitrobenzoyl, the p-nitrobenzoyl derivative obtained in this last case being subsequently reduced to a p-aminobenzoyl derivative. According to this invention, a secondary alcohol having the general formula

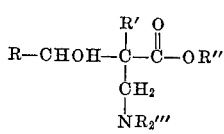

in which R designates an alkyl or an aryl radical, and R' and R'' each designate an alkyl radical and NR$_2$''' is a secondary amine residue, is reacted with a haloid of benzoyl or of p-nitrobenzoyl so as to obtain a benzoyl derivative or a p-nitrobenzoyl derivative having the general formulas

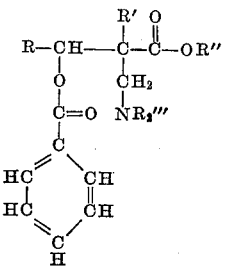

or

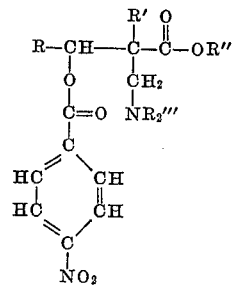

in which R, R' and R'' and NR$_2$''' have the significance indicated above.

It will be understood that, in all the formulas indicated in the specification and claims of this application, R, R' and R'' can be identical or they can be different one from another.

The benzoyl derivatives and the p-aminobenzoyl derivatives referred to herein constitute powerful local anaesthetics.

Other objects and details of this invention will be apparent from the following examples thereof, which are illustrative of my invention, although it is to be understood that the invention is not limited thereto but is also capable of many other embodiments as well as modifications of the proportions, temperatures, time of treatment, etc.

Example I 40 grams of ethyl α-ethyl-acetoacetate are mixed with 18 grams of diethylamine. The mixture is cooled to the lowest available temperature with ice and common salt, and there is cooled at the same time an aqueous solution containing 35% by weight of formaldehyde. The aqueous solution of formaldehyde is then added slowly to the mixture of ethyl α-ethyl-acetoacetate and diethylamine.

The mixture of the said three reagents is then clarified by the addition of 40 to 50 cc. of cooled methyl alcohol.

After about an hour the condensation is ended.

Thereupon, the reaction product is cooled to 10° C. and is then neutralized by the addition of 40 grams of hydrochloric acid in water, having a strength of 25% by weight which has been previously cooled. The product is then agitated with any desired amount of ether, to recover the neutral portions, which are comprised in the main of ethyl α-ethyl-acetoacetate and which have not reacted.

The acid solution remaining is then made alkaline with the aid of 70 grams of a water solution of caustic potash having a strength of 30% by weight, previously cooled, and is treated again with ether. The ether extract, dried over potassium carbonate, leaves after distillation a residue of 35 grams. By distillation under a vacuum, of the basic residue, the α-ethyl-α-diethyl-aminomethyl-acetoacetic ester is obtained, which boils at 136–138° C. under a pressure of 19 mm. of mercury.

The reaction of condensation between the ethyl α-ethyl-acetoacetate, the diethylamine and the formaldehyde can be represented as follows:

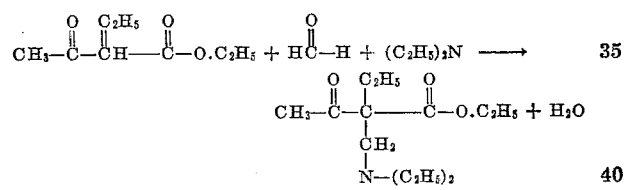

Example II 36 grams of ethyl α-methyl-acetoacetate, prepared for instance by the process described in Jour. Prak. Chim. 72 (2nd series) page 553, 1905, are mixed in the cold (in ice) with 18 grams of diethylamine and 22 grams of a water solution containing 35% by weight of formaldehyde. The mixture is rendered homogeneous by the addition of any desired amount of ethyl alcohol.

When the condensation is ended the ethyl alcohol is driven off by distillation, under any desired amount of vacuum, and at a relatively low temperature. Then the residue of the distillation is cooled to −10° C. and is neutralized by means of hydrochloric acid, previously cooled. The neutral portions, consisting in the main of ethyl α-methyl-acetoacetate, are recovered unchanged with ether. The product is then alkalinized with caustic potash cooled to any desired extent and the basic products obtained are extracted with ether.

The extract treated with ether, dried over sodium sulfate, leaves, after distillation, a residue of 30 grams by distillation under any desired vacuum of the basic residue and there is obtained 26 grams of ethyl α-methyl-α-diethylamino-ethyl acetoacetate boiling at 129° C. under a pressure of 19 mm. of mercury.

Example III 40 grams of ethyl α-ethyl-acetoacetate are condensed as in the Example I, with 30 grams of an aqueous solution containing 40% by weight of dimethylamine and 22 grams of a water solution containing 35% by weight of formaldehyde. There is obtained 30 grams of α-ethyl-α-dimethylaminomethyl-acetoacetic ester boiling at 108–110° C. under a pressure of 19 mm. of mercury.

Example IV 25 grams of ethyl α-methyl-benzoylacetate are heated for 15 minutes in a water bath with 3 grams of paraformaldehyde and 9.5 grams of an ethyl alcohol solution containing 50% by weight of dimethylamine. After cooling, one proceeds as in Example I. There is obtained 19 grams of ethyl α-methyl-α-dimethylaminomethylbenzoylacetate having a red color. The compound obtained decomposes when distilled.

By introducing dry hydrochloric acid in a dry solution in ether of the compound obtained as above, there is obtained 16 grams of the hydrochloride of ethyl α-methyl-α-dimethylaminomethyl-benzoylacetate which, after crystallization from ethyl acetate, has a melting point of 146–147° C.

Example V 22 grams of ethyl α-ethylbenzoylacetate prepared by the Bayer process (Ber. 16, page 2130, 1883), are heated as in the Example III, with 2 grams of paraformaldehyde and 8.5 grams of piperidine. After cooling, one proceeds as in the Example I. There is obtained 19.5 grams of ethyl α-ethyl-α-N-piperidylmethylbenzoylacetate having a red color.

The reaction of condensation between the three reagents mentioned above can be stated chemically as follows:

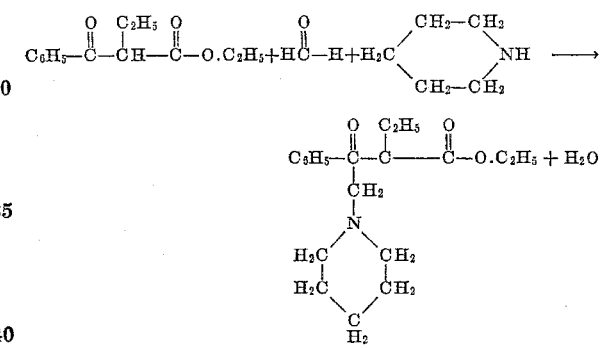

By introducing dry hydrochloric acid into a dry ether solution of ethyl α-ethyl-α-N-piperidylmethyl-benzoylacetate, there is obtained 19.5 grams of the hydrochloride of this ester, which, after crystallization from ethyl acetate melts at 144–145° C.

Example VI

The α-ethyl-α-diethylaminomethyl-acetoacetic ester obtained in Example I is reduced to a secondary alcohol by aluminium amalgam according to the following diagram:

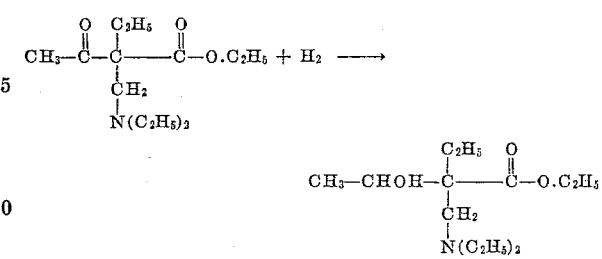

There is employed approximately four times the theoretical quantity of sodium amalgam, if this is used. This amalgam is placed under ether and is added to the ester at one time. Then there is added slowly the water necessary to the reaction, in order that the same will not be too violent.

The reaction of hydrogenation proceeds at ordinary temperatures. When the reaction is ended there is added thereto a water solution containing 25% by weight of caustic soda to dissolve the aluminium hydroxide formed.

The ether layer is separated therefrom and the alkalinized solution is treated with ether several different times. The total ether extract is then dried over potassium carbonate and the ether is driven off by distillation. The residue is then distilled under any desired vacuum and there is obtained the secondary alcohol, boiling at 146° C. under a pressure of 19 mm. of mercury. The secondary alcohol thus obtained is unstable.

*Example VII*

The secondary alcohol obtained in Example VI is esterified by means of benzoyl chloride according to the following diagram:

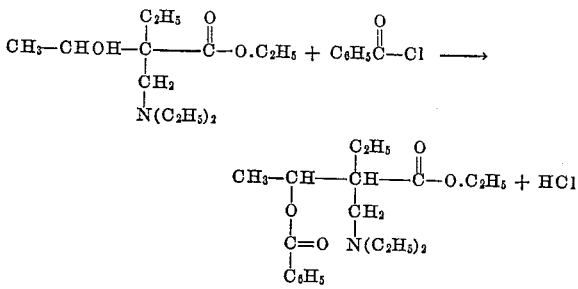

6 grams of the secondary alcohol, obtained as in the Example VI, are dissolved in 10–15 cc. of chloroform and are then treated little by little with a solution of 3.4 grams of benzoyl chloride dissolved in chloroform.

When the reaction is ended, the chloroform is distilled off and there is obtained a non-crystallized residue, which is treated with dry ether or ethyl acetate or a mixture of these two solvents. Upon crystallization there is obtained 8.8 grams of the hydrochloride which, after the crystallization in a mixture of ethyl alcohol and ethyl acetate, melts at 138° C.

The hydrochloride is dissolved in water. The aqueous solution, when treated with ammonia, gives a flocculent precipitate, which is recovered and recrystallized in dilute ethyl alcohol. The ester of the benzoic acid finally obtained melts at 33° C.

*Example VIII*

There can likewise be prepared the ester of p-aminobenzoic acid and the alcohol obtained in Example VI by treating 10.8 grams of said alcohol dissolved in chloroform with a solution of 8.2 grams of p-nitro-benzoyl chloride.

In proceeding substantially in accordance with Example VI, there is obtained 11.5 grams of the hydrochloride melting at 161° C.

10 grams of this hydrochloride dissolved in methyl alcohol are reduced by treatment with the aid of platinum. After reduction, it is subjected to filtration and the methyl alcohol is driven off by distillation under reduced pressure. The residue from the distillation under a vacuum, which separates out in the form of a non-crystallizable residue of a yellowish brown color, is then dissolved in water and precipitated with ammonia.

The flocculent precipitate obtained is recrystallized in a mixture of ethyl acetate and petroleum ether or in absolute alcohol. The final p-aminobenzoic ester melts at 194° C. and its hydrochloride melts at 198–199° C.

It is to be understood that the invention is not limited to the above mentioned examples and that many modifications can be made in the described operations within the scope of the claims.

I claim:

1. A process for the preparation of a derivative of an ester of a β-ketonic acid having the general formula

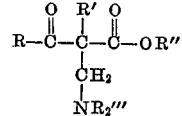

wherein R represents a phenyl radical, R' and R" represent lower alkyl radicals, and NR₂''' represents the N-piperidyl radical, which comprises reacting a β-ketonic ester having the general formula

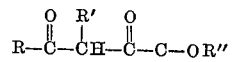

wherein R represents a phenyl radical, and R' and R" represent lower alkyl radicals with formaldehyde and piperidine.

2. A process for preparing ethyl-α-ethyl-α-N-piperidylmethyl-benzoylacetate which comprises reacting ethyl-α-ethyl-benzoylacetate with piperidine and formaldehyde.

3. A derivative of an ester of a β-ketonic acid having the general formula

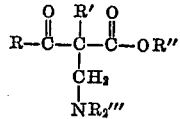

wherein R represents a phenyl radical, R' and R" represent lower alkyl radicals, and NR₂''' represents the N-piperidyl radical.

4. Ethyl-α-ethyl-α-N-piperidylmethyl-benzoylacetate.

References Cited in the file of this patent

FOREIGN PATENTS

| | | |
|---|---|---|
| 104,334 | Switzerland | May 1, 1924 |
| 983,607 | France | Feb. 14, 1951 |

OTHER REFERENCES

Baeyer et al.: Berichte, vol. 16 (1883), p. 2130.
Bodendorf et al.: Annalen, vol. 562 (1949), pp. 1–14.